United States Patent [19]

Chenot

[11] Patent Number: 4,613,453
[45] Date of Patent: Sep. 23, 1986

[54] COMPENSATORY PROCEDURE FOR PREPARING HALOAPATITE PHOSPHORS

[75] Inventor: Charles F. Chenot, Towanda, Pa.

[73] Assignee: GTE Products Corporation, Stamford, Conn.

[21] Appl. No.: 773,271

[22] Filed: Sep. 6, 1985

Related U.S. Application Data

[63] Continuation of Ser. No. 378,367, May 14, 1982, abandoned.

[51] Int. Cl.$^4$ ............................................. C09K 11/453
[52] U.S. Cl. ......................... 252/301.6 P; 252/301.4 P
[58] Field of Search .................. 252/301.4 P, 301.6 P

[56] References Cited

U.S. PATENT DOCUMENTS 3,549,553 12/1970 Wachtel ........................ 252/301.4 P
3,655,576 4/1972 Layman et al. .............. 252/301.4 P
3,764,555 10/1973 Vincent et al. ............... 252/301.4 P

FOREIGN PATENT DOCUMENTS 219054 11/1968 U.S.S.R. ....................... 252/301.4 P

Primary Examiner—Jack Cooper
Attorney, Agent, or Firm—James Theodosopoulos

[57] ABSTRACT

In the manufacture of an alkaline earth haloapatite phosphor, raw materials including calcium carbonate are blended together and then fired. However, before blending, the particle size of the calcium carbonate is first determined, and the quantities of some of the other raw materials are adjusted in a manner dependent on said particle size.

1 Claim, 4 Drawing Figures

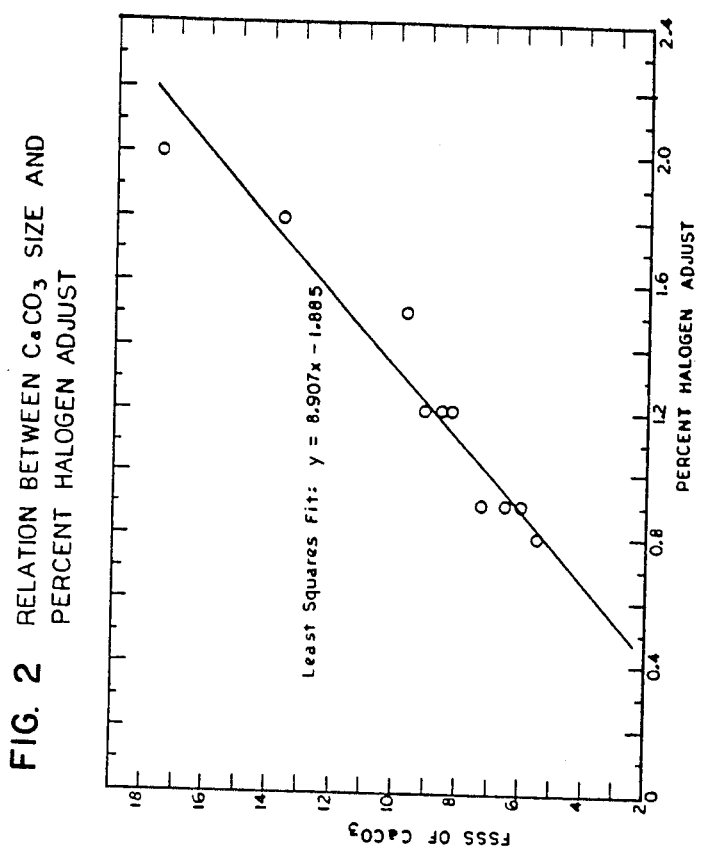
FIG. 2  RELATION BETWEEN CaCO₃ SIZE AND PERCENT HALOGEN ADJUST
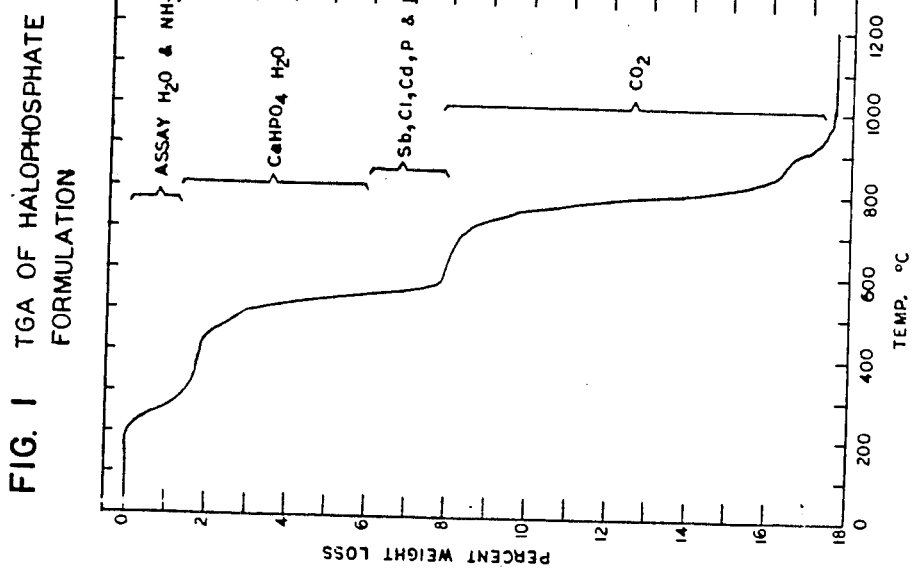
FIG. 1  TGA OF HALOPHOSPHATE FORMULATION FIG. 3 RELATION BETWEEN $CaCO_3$ SIZE AND PERCENT MANGANESE ADJUST
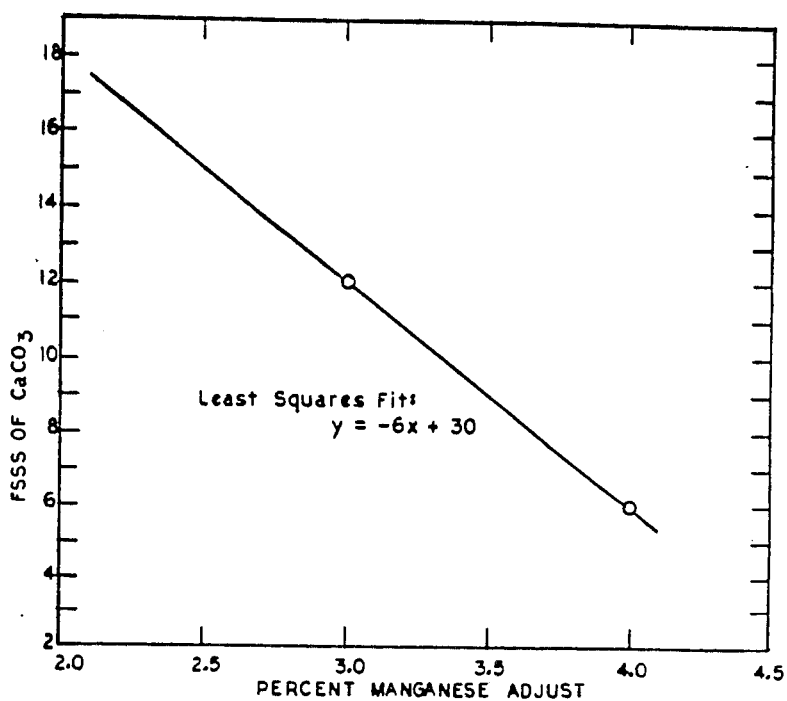
FIG. 4 COLOR CONSISTANCY FOR COOL WHITE (PLAQUE)
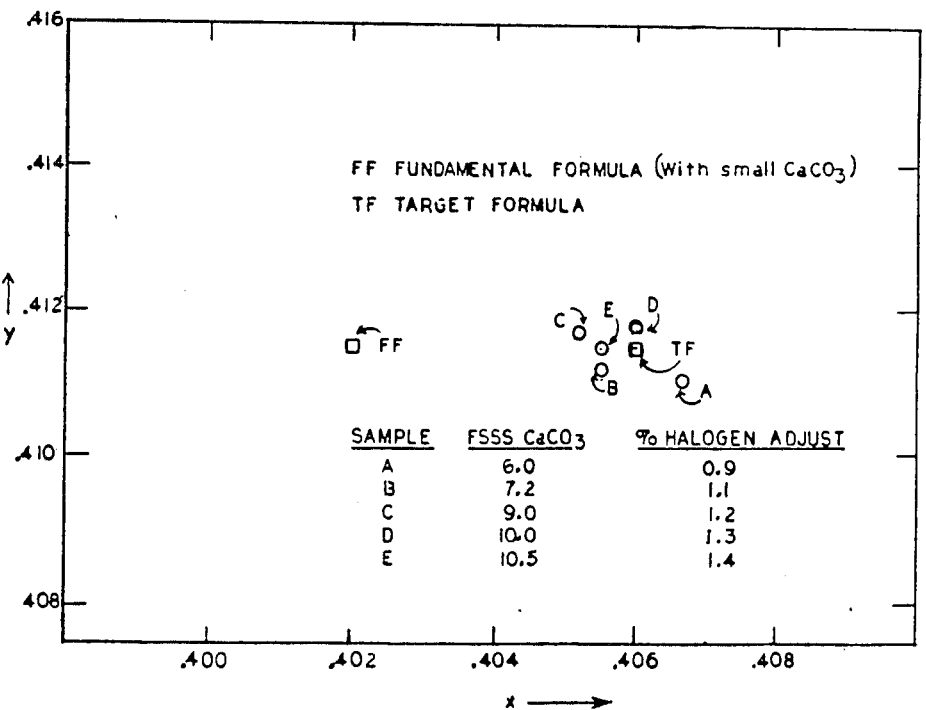

COMPENSATORY PROCEDURE FOR PREPARING HALOAPATITE PHOSPHORS

This application is a continuation, of application Ser. No. 378,367, filed May 14, 1982 now abandoned.

Preparative procedures are described wherein compensation is made for reaction mechanism variations experienced in preparation of the standard mixed halogen alkaline earth apatite phosphors. The discovery and development of these compensatory procedures results in optimum phosphor formulae regardless of variations in the reaction kinetics imposed by small, but important variations in the raw materials (intermediate compounds) used in the synthesis of these phosphors.

For mixed halogen (fluor-chlor) apatite phosphors, proper compensation for reactivity variations associated with $CaCO_3$ raw material is detailed with emphasis on associated adjustments in the other raw materials necessary to achieve a phosphor material at a proper and consistent color (chromaticity) and at an optimum fluorescence efficiency. The achievement of this higher quality consistency results in an overall improvement in the standard, mixed halogen alkaline earth apatite phosphors and overall improvement in fluorescent lamps utilizing these improved phosphors.

The present disclosure relates to mixed halogen alkaline earth apatite phosphor materials used in the manufacture of fluorescent lamps and more particularly to the achievement of consistent and improved quality of standard fluor-chlor calcium apatite phosphors, also referred to as the standard halophosphate phosphors.

The standard halophosphate phosphors comprise a broad range of color temperature options when used in fluorescent lamps as a function of the ionic ratio between the primary activator ion $Sb^{3+}$ and the co-activator ion $Mn^{2+}$. Further color variation is realized as a function of the ionic ratio between the halogen ions most commonly used, the fluoride and chloride ions. Achievement of a nearly stoichiometric product with the apatite crystal structure and proper Sb/Mn and F/Cl ionic ratios is the synthesis goal; this nearly stoichiometric family of phosphor materials can be represented by the following chemical formula characterizing the heat treated product:

$$[Ca_{5-w-x-y}Sb_wMn_xCd_y(F_{1-z}Cl_z)_{1-w}O_w(PO_4)_3]_u \cdot [Ca_2P_2O_7]_v$$

where:
$0.02 \leq w \leq 0.05$
$0 \leq x \leq 0.3$
$0.04 \leq y \leq 0.06$
$0.05 \leq z \leq 0.25$
$0 \leq v/u < 0.1$
$u + v = 1.0$ This formula provides for the many commonly accepted features characterizing well formed, optimum or nearly optimum standard halophosphate phosphors including:

a slight deficiency in the total halogen content to provide oxygen charge compensation associated with $Sb^{3+}$ substitution into a $Ca^{2+}$ site;

a slight phosphate excess providing sufficient Ca/P non-stoichiometry to assure a small quantity of $\beta$ $Ca_2P_2O_7$ second phase formation in preference to $Ca_3(PO_4)_2$ formation, the latter being detrimental to phosphor brightness when highly doped with $Mn^{2+}$.

Common procedures for the preparation of standard halophosphate phosphors from this formulation system involve the admixing and intimate blending of strategic well defined amounts of the following raw materials, followed by heat treatment at temperatures around 1100° to 1150° C. for several hours in an air shielded or neutral firing atmosphere:

$CaHPO_4.2H_2O$ or $CaHPO_4$ or $Ca_2P_2O_7$ or $Ca_3(PO_4)_2$
$CaCO_3$ or $CaO$
$CaF_2$
$NH_4Cl$ or $CaCl_2$
$MnCO_3$ or $Mn_2P_2O_7$ or $MnNH_4PO_4.H_2O$
$Sb_2O_3$ or $SbPO_4$ or $Sb_4O_5Cl_2$
$CdO$ or $Cd_2P_2O_7$ or $CdNH_4PO_4.H_2O$.

Normally associated with firing typical halophosphate formulae is the volatilization of significant amounts of Sb and Cl and less significant, but measurable, amounts of Cd (if used) in the form of Sb or Cd chloride or oxychloride compounds, often referred to as flue dust. With the mixed F/Cl halogen system the presence of Cl appears to render the $POF_3$ volatilization mechanism, associated more prominently with the synthesis of the single-halogen-containing alkaline earth fluorapatite materials, relatively less significant compared to the more dramatic volatilization mechanism associated with chlorine. However some $POF_3$ loss can be accounted for analytically. These volatile losses account for significant losses of the Sb, Cd (if used) and Cl components plus small losses of the P and F components. Proper anticipatory excesses of raw materials must be provided in the preheat treated formulation in order to achieve the proper post heat treated phosphor composition.

A common procedure achieving this necessary anticipatory formulation is to select representative raw materials and empirically develop an optimum formulation for a given set of heat treatment conditions. This produces for the standard cool white phosphors, a product characterized by the following brightness quality and its associated standard deviation, as determined on over 100 statistically averaged 40T12 lamp test evaluations:

Typical Average Brightness—3100 Lumens
Typical Standard Deviation—30 Lumens.

The standard deviation cited here must be recognized as reflecting a strong variation as a result of lamp manufacturing parameters, a contribution thought to be at least on the order of 50% of the standard deviation magnitude. This suggests that about one half i.e., 15 lumens, of the standard deviation represents intrinsic phosphor quality variation, the part being addressed by this disclosure.

During phosphor synthesis, the reaction mechanism is essentially dynamic, never achieving a state of equilibrium, and variable, dependent in part on the physical chemical characteristics of the raw materials. The desire in a dynamic situation, such as this, is to minimize the variables as much as possible or to compensate for the variables in a manner that renders them insignificant in the reaction mechanism for given preparation conditions. Achieving this goal and thus lowering the standard deviation portion representing intrinsic phosphor quality is a means of producing a more consistent and overall high quality phosphor product evidenced by improved brightness and a lower standard deviation.

In acordance with this invention, a procedure for the synthesis of more consistent, higher quality mixed halogen alkaline earth apatite phosphor materials is characterized by imposing proper formulation compensation for physical chemical variation in the raw materials, most notable of these associated with the $CaCO_3$ component.

During the course of the reaction among the following typical raw materials used in the synthesis of the standard halophosphate phosphors, $CaHPO_4$, $CaCO_3$, $CaF_2$, $NH_4Cl$, $MnCO_3$, $Sb_2O_3$, CdO, interim reactions are underway through most of the temperature rise during the heat treatment period. The decomposition of $CaCO_3$ is among the last interim processes to occur prior to complete apatite formation. Thus, the attainment of the final product is dependent on the kinetics associated with the $CaCO_3$ decomposition. Likewise the duration of Sb, Cd and Cl and to a lesser extent P and F associated interim volatization reactions is dependent on the kinetics associated with $CaCO_3$ decompositon.

Features determined to affect or influence the $CaCO_3$ decomposition kinetics include:

polymorphic form of $CaCO_3$, e.g., aragonite, vaterite and calcite;

surface area and associated particle size;

catalysis of decomposition by the presence of finely divided calcium phosphate and transition metal containing intermediate phases.

Of these features the polymorphic form and the surface area and associated particle size of the $CaCO_3$ are the most variable and when properly compensated for provide the means of attaining the desired more consistent phosphor product. Because of practical considerations having to do with purity and handling characteristics, the calcite form of $CaCO_3$ is most commonly used, leaving the surface area and associated particle size parameters the primary variable to be compensated for.

A floating formula for each standard halophosphate type has been thereby derived which provides a means of compensating for the variable interim volatilization reactions as a function of the surface area and associated particle size characteristics of the calcite form of $CaCO_3$ used in the formulation.

In the drawing

FIG. 1 is the Thermal Gravimetric Analysis (TGA) representation of the progressive weight losses occurring during the heat treatment of a typical standard halophosphate formulation.

FIG. 2 is the relationship established between the particle size of the calcite form of $CaCO_3$ (as determined by Fisher Sub-Sieve-Size) and the percent halogen adjustment necessary to provide proper formulation compensation.

FIG. 3 is the relationship established between the particle size of the calcite form of $CaCO_3$ (as determined by Fisher Sub-Sieve-Size) and the percent manganese adjustment necessary to provide proper formulation compensation.

FIG. 4 is a portion of the chromaticity diagram showing the color consistency for standard cool white phosphor realized by imposing the adjustments determined for variations in the size characteristics of the calcite $CaCO_3$ used in the phosphor formulations.

Referring to FIG. 1 the sequence of weight loss related chemical activity, as monitored by TGA, is terminated with the decomposition of the $CaCO_3$ component during the heat treatment of a typical standard halophosphate formulation. The quantity of volatile Sb, Cd and Cl containing compounds produced in the sequence is dependent on the overall reaction kinetics as dictated in part by the $CaCO_3$ decomposition kinetics. Thus, a faster decomposing $CaCO_3$ component, associated with small particle size, high surface area material, will promote faster apatite formation and small Sb, Cd, Cl, P and F losses. Likewise, a slower decomposing $CaCO_3$ component, associated with large particle size, low surface area material, will promote slower apatite formation and large Sb, Cd, Cl, P and F losses.

Maximization of fluorescence brightness and attainment of constant color (chromaticity) were the criteria established to determine empirically the relationships between the particle characteristics of the calcite $CaCO_3$ component and the various formulation adjustments. Referring now to FIG. 2 the empirical relationship between the particle size of $CaCO_3$ (as determined by Fisher-Sub-Sieve-Size) and the percent halogen adjustment is shown. This relationship was established using $CaCO_3$ material varying in size from about 5.4 microns to about 17.5 microns. The percent halogen adjustment is a weight (or mole) percent addition adjustment of the halogen containing raw material component over a fundamental formula, which upon extrapolation would require the use of an infinitesimally small sized $CaCO_3$ to require no halogen adjustment.

During the course of the formulation refinement involving halogen adjustments, the necessity to provide some further adjustment in the manganese-containing component was determined. Upon imposing increasingly severe halogen adjustment, associated with increasingly large size $CaCO_3$ component, a slight gradual decrease in the manganese concentration is found necessary to realize the maximum brightness, constant color criteria. Referring now to FIG. 3 the empirical relationship between the particle size of $CaCO_3$ and the percent Mn adjustment is shown. This relationship was likewise established using $CaCO_3$ material varying in size from about 5.4 microns to about 17.5 microns. The percent Mn adjust is a weight (or mole) percent substractive adjustment of the Mn-containing raw material component over the same fundamental formula referred to regarding the halogen adjustment.

Because of the importance of the standard cool white halophosphate phosphor system, the empirical relationships as displayed in FIGS. 2 and 3 are applied mathematically to the fundamental formula for standard cool white in the following table where A is the weight fraction halogen adjust determined from FIG. 2 for a given $CaCO_3$ size (i.e., percent halogen adjustment divided by 100) and B is the weight fraction Mn adjust determined from FIG. 3 for a given $CaCO_3$ size (i.e., percent Mn adjust divided by 100).

TABLE I

| Component | Cool White Fundamental Formula | Formula Adjustment |
|---|---|---|
| $CaHPO_4$ | 3.00 | None |
| $CaCO_3$ | 1.242 | 1.242−0.438A − (0.2)(0.087B) |
| $CaF_2$ | 0.438 | 0.438(1 + A) − (0.8)(0.087B) |
| $NH_4Cl$ | 0.180 | 0.180(1 + 2A) |
| $MnCO_3$ | 0.087 | 0.087(1 + B) |
| $Sb_2O_3$ | 0.0355 | 0.0355 + (0.18/4)(2A) |

TABLE I-continued

| Component | Cool White Fundamental Formula | Formula Adjustment |
| --- | --- | --- |
| CdO | 0.053 | None |

Similar formula adjustment expressions can be established and applied to the formulation of the other standard halophosphate phosphor systems including standard warm white and standard white.

The necessity of imposing these adjustments is apparent when considering the differential chromaticity data shown in FIG. 4. These data represent intrinsic color point characterization of several halophosphate samples by plaque measurements, i.e., minus the chromaticity influence imposed by the visible portion of the mercury discharge present in lamp chromaticity characterization. The samples selected represent a set of standard cool white materials prepared from $CaCO_3$ materials covering a broad range of particle size.

As shown, the achievement of the desired consistent color point with respect to the reference formula (fundamental formula for standard cool white) requires a broad range of formulation adjustment to compensate for the variable $CaCO_3$ particle size characteristics. A mechanistic explanation for this dependence concerns the reactivity or reaction kinetics of the $CaCO_3$ decomposition. If slow, i.e., large sized, $CaCO_3$ is involved, large volatile losses are incurred requiring significant formula adjustments including especially increased Sb, Cl, and F plus slightly lower Mn. If fast, i.e., small sized, $CaCO_3$ is involved, small volatile losses are incurred requiring minimum formular adjustments.

An illustration of the application of the invention is as follows. Say the particle size of the calcium carbonate is 16 microns. From FIG. 2, A is determined to be 0.02 and from FIG. 3, B is determined to be 0.024. In the above formula for cool white, the amount of $CaCO_3$ would be decreased from 1.242 units for the fundamental formula to 1.233, the amount of $CaF_2$ would be increased from 0.438 units to 0.445 units, the amount of $NH_4Cl$ would be increased from 0.180 units to 0.187 units, the amount of $MnCO_3$ would be increased from 0.087 units to 0.089 units, and the amount of $Sb_2O_3$ would be increased from 0.0355 units to 0.0373 units.

The procedure disclosed herein offers a means of achieving a phosphor powder characterized by the following brightness quality and its associated standard deviation, as determined on over 100 statistically averaged 40T12 lamp test evaluations.

Typical Average Brightness—3155 Lumens

Typical Standard Deviation—27 Lumens

Compared to the average brightness and standard deviation data cited previously for standard cool white phosphor prepared without using compensatory formulations disclosed herein, a brightness improvement of about 50 lumens (about a 1.6% improvement) and a 3 lumen reduction in standard deviation is realized. This is considered a significant advancement in the art of synthesizing and manufacturing the standard halophosphate phosphor materials.

I claim:

1. A method of making a cool white alkaline earth haloapatite phosphor from reactants consisting of $CaHPO_4$, $CaCO_3$ in the calcite form, $CaF_2$, $NH_4Cl$, $MnCO_3$, $Sb_2O_3$ and CdO wherein the respective ratios of said reactants in the fundamental formula of said cool white phosphor are:

3.00:1.242:0.438:0.180:0.087:0.0355:0.053, comprising forming a mixture of said reactants and firing the resultant mixture; said mixture being formed by choosing $CaCO_3$ in the calcite form, of a particle size that corresponds to an ordinate value in FIGS. 2 or 3, determining a weight fraction halogen adjust A that corresponds to said particle size in FIG. 2, determining a weight fraction manganese adjust B that corresponds to said particle size in FIG. 3 and employing said reactants in the following relative amounts: (1) $CaHPO_4$, 3.00, (2) $CaCO_3$, 1.242-0.438A- (0.2) (0.087B) (3) $CaF_2$, 0.438 (1+A)-(0.8)(0.087B) (4) $NH_4Cl$, 0.180 (1+2A) (5) $MnCO_3$, 0.087 (1+B) (6) $Sb_2O_3$, 0.0355+(0.18/4) (2A) (7) CdO, 0.053.

* * * * *